United States Patent
Lopez Belbeze et al.

(10) Patent No.: US 10,480,815 B2
(45) Date of Patent: Nov. 19, 2019

(54) PANEL FOR EXTERNAL AIR-CONDITIONING DUCTS AND SIMILAR PRODUCTS

(71) Applicant: SAINT-GOBAIN ISOVER IBERICA, S.L., Madrid (ES)

(72) Inventors: Gregorio Lopez Belbeze, Madrid (ES); Alfonso Diez Monforte, Madrid (ES)

(73) Assignee: SAINT-GOBAIN ISOVER IBERICA, S.L., Madrid (ES)

( * ) Notice: Subject to any disclaimer, the term of this patent is extended or adjusted under 35 U.S.C. 154(b) by 117 days.

(21) Appl. No.: 15/551,981

(22) PCT Filed: Feb. 15, 2016

(86) PCT No.: PCT/EP2016/053191
§ 371 (c)(1),
(2) Date: Aug. 18, 2017

(87) PCT Pub. No.: WO2016/131781
PCT Pub. Date: Aug. 25, 2016

(65) Prior Publication Data
US 2018/0031268 A1     Feb. 1, 2018

(30) Foreign Application Priority Data

Feb. 19, 2015   (FR) ..................................... 15 51421

(51) Int. Cl.
*F16L 59/00*     (2006.01)
*F24F 13/02*     (2006.01)
(Continued)

(52) U.S. Cl.
CPC ............ *F24F 13/0281* (2013.01); *B32B 1/00* (2013.01); *B32B 3/06* (2013.01); *B32B 3/08* (2013.01);
(Continued)

(58) Field of Classification Search
CPC .. F16L 9/003; F16L 59/04; F16L 59/08; F24F 13/0263; F24F 13/0281
(Continued)

(56) References Cited

U.S. PATENT DOCUMENTS

| | | | |
|---|---|---|---|
| 2004/0126597 A1 | 7/2004 | Cohen et al. | |
| 2005/0115626 A1* | 6/2005 | Juarranz Moratilla | ...................... E04B 9/001 138/149 |

(Continued)

FOREIGN PATENT DOCUMENTS

| | | |
|---|---|---|
| WO | WO 2004/072393 A2 | 8/2004 |
| WO | WO 2011/023807 A1 | 3/2011 |

OTHER PUBLICATIONS

International Search Report dated Mar. 30, 2016, in PCT/EP2016/053191 filed Feb. 15, 2016.

*Primary Examiner* — Patrick F Brinson
(74) *Attorney, Agent, or Firm* — Oblon, McClelland, Maier & Neustadt, L.L.P.

(57) ABSTRACT

A panel for self-supporting ducts, in particular air-conditioning ducts, made up of a core of mineral wool or the like, covered on its external face and on its internal face with an exterior covering and an interior covering, respectively. The interior covering includes or preferably is made up of an aluminum sheet, a layer of a glass fabric or a layer of a glass web. The exterior covering includes the succession of a first layer of plastics material, an aluminum sheet, and a second layer of plastics material. The layers of plastics material are bonded to the aluminum sheet directly or via an adhesive. The exterior covering is bonded to the external surface of the core by glue.

20 Claims, 3 Drawing Sheets

(51) Int. Cl.
- B32B 15/08 (2006.01)
- B32B 15/20 (2006.01)
- F16L 59/02 (2006.01)
- F16L 59/04 (2006.01)
- F16L 59/08 (2006.01)
- F16L 9/00 (2006.01)
- F16L 9/21 (2006.01)
- B32B 5/02 (2006.01)
- B32B 7/12 (2006.01)
- B32B 19/04 (2006.01)
- B32B 19/06 (2006.01)
- B32B 27/06 (2006.01)
- B32B 27/18 (2006.01)
- B32B 27/20 (2006.01)
- B32B 27/30 (2006.01)
- B32B 27/38 (2006.01)
- B32B 27/40 (2006.01)
- B32B 1/00 (2006.01)
- B32B 3/06 (2006.01)
- B32B 3/08 (2006.01)
- B32B 15/09 (2006.01)
- B32B 17/06 (2006.01)

(52) U.S. Cl.
CPC ............. *B32B 5/02* (2013.01); *B32B 5/022* (2013.01); *B32B 7/12* (2013.01); *B32B 15/08* (2013.01); *B32B 15/09* (2013.01); *B32B 15/20* (2013.01); *B32B 17/061* (2013.01); *B32B 17/064* (2013.01); *B32B 19/041* (2013.01); *B32B 19/045* (2013.01); *B32B 19/06* (2013.01); *B32B 27/06* (2013.01); *B32B 27/18* (2013.01); *B32B 27/20* (2013.01); *B32B 27/304* (2013.01); *B32B 27/38* (2013.01); *B32B 27/40* (2013.01); *F16L 9/003* (2013.01); *F16L 9/21* (2013.01); *F16L 59/026* (2013.01); *F16L 59/029* (2013.01); *F16L 59/04* (2013.01); *F16L 59/08* (2013.01); *F24F 13/0263* (2013.01); *B32B 2255/02* (2013.01); *B32B 2255/26* (2013.01); *B32B 2260/021* (2013.01); *B32B 2262/101* (2013.01); *B32B 2307/71* (2013.01); *B32B 2307/712* (2013.01); *B32B 2307/732* (2013.01); *B32B 2419/00* (2013.01); *B32B 2607/00* (2013.01)

(58) Field of Classification Search
USPC ........ 138/149, 155, 157; 428/34.2, 458, 480
See application file for complete search history.

(56) References Cited

U.S. PATENT DOCUMENTS

| | | |
|---|---|---|
| 2005/0123732 A1 | 6/2005 | Cohen et al. |
| 2005/0129896 A1 | 6/2005 | Cohen et al. |
| 2006/0078699 A1 | 4/2006 | Mankell et al. |
| 2007/0154695 A1 | 7/2007 | Soriano |
| 2009/0133347 A1* | 5/2009 | Wadsworth ......... F16L 55/0336 52/309.1 |
| 2013/0291990 A1 | 11/2013 | Nagarajan et al. |
| 2013/0295303 A1 | 11/2013 | Parks et al. |
| 2016/0025371 A1 | 1/2016 | Parks et al. |

* cited by examiner

PANEL FOR EXTERNAL AIR-CONDITIONING DUCTS AND SIMILAR PRODUCTS

The present invention relates to a panel for air ducts, more specifically for forming ducts that are intended to distribute conditioned air and are likely to be exposed to bad weather.

The present invention relates very particularly to the ducts obtained from such panels. Very particularly, the present invention relates to the field of ducts that are referred to in the field as "self-supporting", since their mechanical stiffness characteristics are not brought about by an internal metal sheath or tube but by a core of high-density mineral fibres. Such ducts therefore do not have a metal sheath.

The subject of the invention is to obtain optimum sealing in the connect ion between the various modules which are formed from panels, thereby forming distribution ducts for conditioned air, all with quick and easy assembly.

Currently, the ducts provided for distributing conditioned air that are exposed to bad weather are made up of modular prismatic tubular elements, made of sheet metal, that are fixed together in a suitable manner and that are not insulated when they leave the factory, so that they have to be sheathed with a thermal insulation material during subsequent operations, this having the expected consequent negative effect on costs.

It should be noted that in addition to this kind of problem, this type of "module" is also extremely bulky, with the consequent problems that this implies from the point of view of transport and storage.

It is known that an air flow can also be conducted into an installation for transporting conditioned air that is disposed inside (that is to say in an environment protected from outside climatic conditions) with the aid of ducts formed from a rigid structure manufactured with insulating panels, made of glass wool, rock wool or of a similar material, that are coupled together in succession along paths with sometimes significant lengths, as far as the final space to be conditioned. Such a structure is described for example in application EP 1532391, to which reference will be made for more details concerning such an implementation. However, when all or some of these paths have to pass through spaces disposed outside, use is nowadays exclusively made of ducts with a metal sheath for the better resistance thereof to bad weather.

In other words, the use of self-supporting ducts outside is only conceivable if the ducts are suitably protected on their exterior surface, not only with regard to the more or less severe atmospheric conditions in the environment, but also against any aggressiveness arising from the activities carried out in this environment. It follows that the nature and choice of the successive materials that constitute the protective jacket of the duct is essential.

Likewise, the self-supporting duct should be durable over time and have a sufficiently high ageing performance to ensure the sealing of the system over the years, during which the duct has to withstand strong sunlight in summer, in order to transfer cool air, and cold outside conditions in winter, in order to transfer warm air.

Finally, such a structure disposed outside should thus have extremely high and long-lasting moisture-resistant, heat-resistant and cold-resistant properties.

The aim of the invention is to propose a structure having such capabilities, which is easy and economical to manufacture and produce.

The subject of the invention consists of the solution to the problems set out above.

More specifically, the panels have a "sandwich"-type structure in which there is a central core made of insulating material, preferably mineral wool, an external layer that is resistant to bad weather and made up of a layer of plastics material covered with an aluminium sheet which, in turn, is protected in particular from ultraviolet radiation, said external layer being fixed to said central core by means of a glue, and an internal layer based on aluminium, a textile covering or a glass web, which is also fixed to the interior face of the abovementioned insulating core.

More particularly, the present invention relates to a panel for self-supporting ducts, in particular air-conditioning ducts, made up of a core of mineral wool or the like, covered on its external face and on its internal face with an exterior covering and an interior covering, respectively, said panel being characterized in that:
  said interior covering comprises or preferably is made up of an aluminium sheet, a layer of a glass fabric or a layer of a glass web,
  the exterior covering comprises the succession of a first layer of plastics material, an aluminium sheet, and a second layer of plastics material, said layers of plastics material being bonded to the aluminium sheet directly or via an adhesive, said exterior covering being bonded to the external surface of the core by a glue.

According to particular and preferred (but non-limiting) embodiments of the invention, which may if necessary be combined with one another:
  The overall thickness of the exterior covering is between 0.05 mm and 0.50 mm.
  The first layer of plastics material and second layer of plastics material are made of polyester.
  The exterior covering furthermore comprises an external layer made up of a UV protective film, in particular chosen from highly ultraviolet-resistant epoxy resins, urethanes, or polyvinyl fluorides.
  The exterior covering is glued to the core by a polyurethane PU glue, a low-density polyethylene (LDPE) glue, hotmelt glues, or water-based glues, preferably PU glue or LDPE glue.
  The external surface of the central core furthermore comprises a web of glass fibres or synthetic fibres, said web preferably being bonded to the central core by the same binder as is used for crosslinking the mineral fibres that make up said core.
  The exterior covering comprises at least two aluminium sheets, each aluminium sheet being bonded directly, or via an adhesive, to a layer of plastics material, preferably made of polyester.
  The panel comprises in succession, starting from the external surface of the mineral wool core:
  a web of glass fibres integrated with the mineral fibres that make up the core,
  a layer of adhesive, in particular of the type of those described above,
  an external covering comprising a succession of layers of plastics material and one or more aluminium sheets,
  optionally an external layer made up of a UV protective film.
  The panels end at their extremities in edges to be interlocked: as far as the connecting means between the panels obtained are concerned, provision is made for these to have an interlocking profile, so as to obtain a sealed connection that is as perfect as possible. In this way, air ducts which may be exposed to bad weather, are thermally insulated and have a covering which provides an absolute vapour barrier, being extremely versatile since they make it possible to obtain ducts with highly varied dimensions and geometries from one and the same "universal" panel can be obtained from initially flat panels.

The covering of the panel is extended somewhat by a flap such that, when it is joined to another module, it partially overlaps the covering of said module and is sealed by a strip of the same material.

The interior covering which determines the interior face of the duct is extended beyond the edge of the panel, being fixed to the surface which defines the connecting profile.

A panel according to the invention can for example be a panel for external ducts, in particular for external air-conditioning ducts and similar products.

The invention also relates to a self-supporting duct manufactured from panels as described above.

According to an example, the duct is installed outside a building with its exterior layer exposed to weather.

Finally, the invention relates to the use of above-described panels for manufacturing self-supporting ducts, in particular for distributing conditioned air.

According to an example of use, the duct is mounted outside a building with its exterior layer exposed to weather.

To complete the above description of the present invention and aid with better comprehension of the features thereof, a preferred (but non-limiting) practical exemplary embodiment thereof is described in the following text, with regard to the appended set of drawings, as an integral part of said description, in which, by way of non-limiting illustration:

Figure 1:
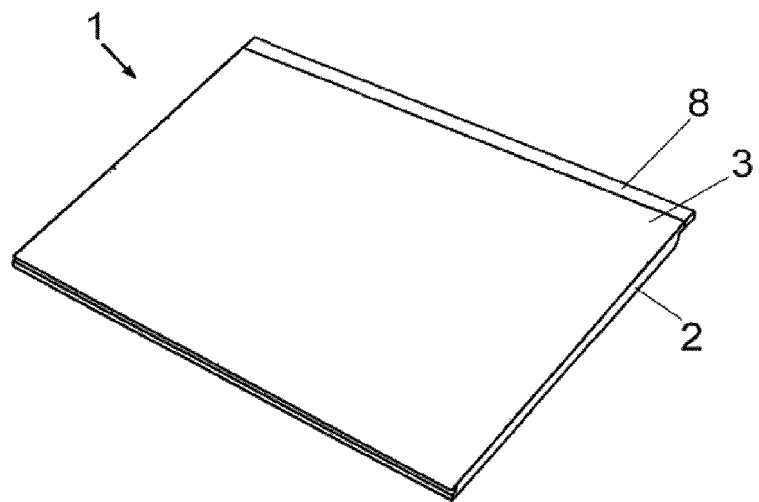
FIG. 1 shows a perspective depiction of a panel from which a module for forming external air-conditioning ducts is obtained, all realized in accordance with the subject of the present invention.
Figure 2:
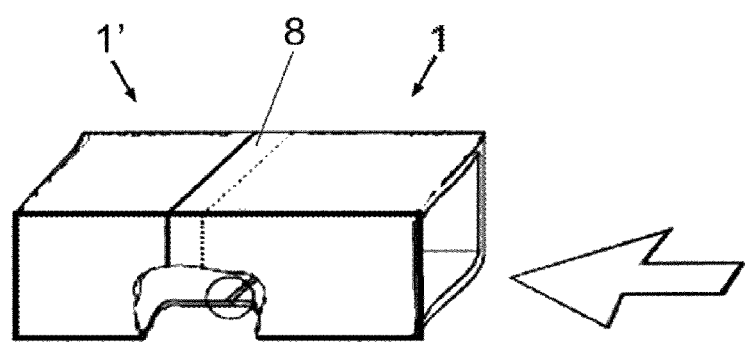
FIG. 2 shows a perspective view of the connection of two contiguous modules within the self-supporting duct according to the invention.
Figure 4:
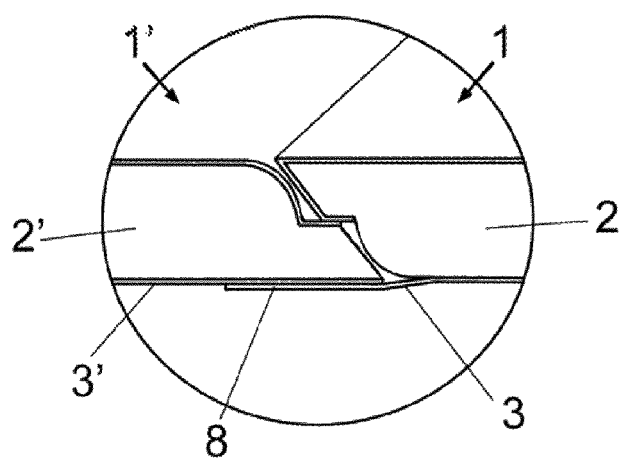

FIG. 4 schematically shows an enlarged detail view of a second variant embodiment of the connection shown in FIG. 2.

Figure 5:
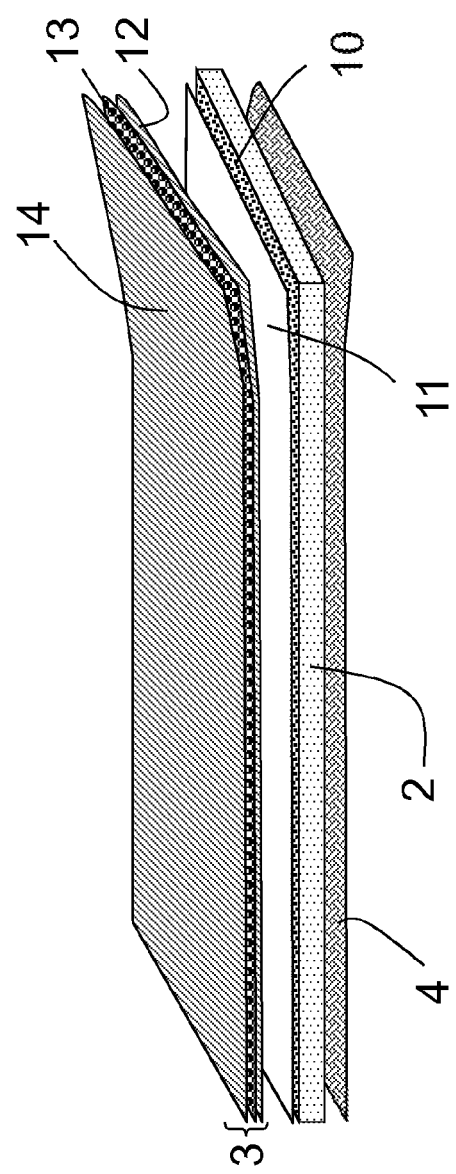

FIG. 5 illustrates an exploded view of the set of elements that make up the panel and the duct, according to a first embodiment of the invention.

As can be seen in the abovementioned figures, the panel (1-1') according to the invention is made up of a core (2-2') of mineral wool or the like, which is covered on its face considered to be the external face with an exterior covering (3-3') that makes it resistant to bad weather. This exterior covering comprises a layer of plastics material covered with an aluminium sheet, which, in turn, is preferably protected against ultraviolet radiation, while, on what will be the internal face of the duct, it is covered with a layer of aluminium, glass fabric or glass web (4-4') that is fixed to said core by means of an adhesive (not shown in the figures) that is able to withstand the extreme conditions that can arise in the open air, as described above.

Proceeding from this structure, and with appropriate cutting and bending tools, it is possible according to the invention to form, with a single type of panel, a multitude of ducts of different types, configurations and geometries, quickly and easily, as described in particular in publication EP 1 532 391 A1.

Figure 3:
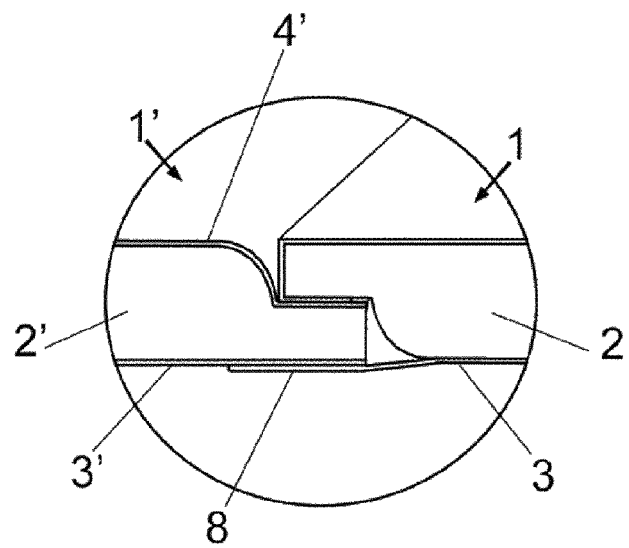
FIG. 3 shows an enlarged detail view of a first variant embodiment of the connection shown in FIG. 2.

As far as the manner in which modules are connected together within self-supporting ducts is concerned, provision is made for the panels to end at their extremities with edges to be interlocked, such as the ones shown in detail in FIGS. 3 and 4, such that preferably the exterior multilayer covering (3) is extended somewhat by a flap (9) which partially overlaps the covering (3') of the contiguous module, thereby preventing the ingress of water/moisture. A strip of the same material as the covering will be used.

This interlock may be straight, as shown in FIG. 3, or oblique, as shown in FIG. 4, without this affecting the essence of the invention.

In a similar manner, optionally, the aluminium layer or covering which determines the interior face of the duct can be extended beyond the edge of the panel, being fixed to the surface which defines the connecting profile.

FIG. 5 shows a panel for an exterior duct, depicting a configuration according to the invention. A panel or a duct according to the invention can thus comprise further, additional elements, in particular additional layers and/or sheets that are used to make up the exterior covering 3.

In FIG. 5, the central core 2 made of mineral wool is bordered on its interior face by a fabric 4 of glass fibres, in particular a Neto® fabric from the applicant company.

The surface away from the central core 2 is reinforced by means of a web of glass fibres 10. In a preferred embodiment, the glass web 10 is deposited on the external face of the core during the manufacture of the dense mat of mineral fibres, before it passes into the oven for curing the binder. In this way, a reinforcing web integrated into the surface of the core made of mineral wool is obtained, that is to say one that is bonded thereto by the same binder that unites the mineral fibres of the core, the reinforcing action of which is thereby improved.

On the external face of the central core 2, that is to say on the face that is turned towards the outside once the self-supporting duct manufactured from the panel, the exterior multilayer covering 3 is positioned and bonded to the surface of the core, above the reinforcement web 10, via a layer of glue 11. This layer of glue is preferably a polyurethane glue but may also be chosen from low-density polyethylene glues, hotmelt glues or water-based glues. A fungicide is advantageously mixed with the layer of glue 11. Experiments carried out by the applicant company have shown that the use of a polyurethane layer in combination with the covering according to the invention is particularly advantageous since it makes it possible to substantially increase the service life of the duct when the latter or a part thereof is fitted outside. More particularly, the formation of the covering 3, in combination with the use of a glue as described above, has proven to be particularly significant for obtaining a duct that is resistant to outside conditions long-term.

In particular, as indicated in FIG. 5, experiments carried out by the applicant company have shown that improved durability of the ducts can be obtained by the use of a covering comprising a succession of aluminium film and layers of plastics material, preferably made of polyester.

In the embodiment shown in FIG. 5, a succession of a first layer 12 of plastics material, in particular polyester, of an aluminium film 13 and of a second layer 14 of plastics material is shown. This second layer of plastics material, which is the outermost layer, is made of polyester for example and can advantageously comprise a component such as anti-UV particles for protecting the underlying layers from strong sunlight.

Alternatively, the top layer 14 made of plastics material can be a layer made up of a UV protective film, in particular chosen from highly ultraviolet-resistant epoxy resins, urethanes or polyvinyl fluorides.

According to another alternative embodiment, a layer of plastics material such as polyester is first of all disposed above the aluminium layer 13, and then the UV protective film, in particular of the type described above.

According to another configuration that is not described in FIG. 5 but included within the scope of the present invention, the protective covering can comprise several aluminium films, for example two aluminium films, that are separated from one another by layers of plastics material of the type indicated above.

According to the invention, the layers of plastics material are bonded directly to the aluminium film or films or alternatively are bonded thereto by way of any adhesive known in the art that allows such a metal/plastic bond (not shown in FIG. 5).

Preferably, according to the invention, the overall thickness of the covering 3 is between 50 micrometers and 500 micrometers, and is very preferably between 30 and 150 micrometers.

The thickness of the aluminium films that are used according to the invention is preferably between 3 and 30 micrometers, and generally between 6 and 20 micrometers.

The thickness of the layers of plastics material that are used according to the invention is preferably between 10 and 50 micrometers, for example between 6 and 30 micrometers.

The invention claimed is:

1. A panel for self-supporting ducts, comprising:
    a core of mineral wool, an external face of the core being covered with an exterior covering and an internal face of the core being covered with an interior covering, respectively,
    wherein said interior covering includes an aluminium sheet, a layer of a glass fabric, or a layer of a glass web,
    wherein the exterior covering includes a succession of a first layer of plastics material, the aluminium sheet, and a second layer of plastics material, said first and second layers of plastics material being bonded to the aluminium sheet directly or via an adhesive, said first layer of plastics material being bonded to the external face of the core by a glue, and
    wherein the second layer of plastics material is an outer layer including anti-UV particles or a UV-protective film, or a surface of the second layer of plastics material is covered with a UV-protective plastic film.

2. The panel according to claim 1, wherein a thickness of the exterior covering is between 0.05 mm and 0.50 mm.

3. The panel according to claim 1, wherein the first layer of plastics material and the second layer of plastics material are made of polyester.

4. The panel according to claim 1, wherein the exterior covering further includes an external layer bonded to the second layer of plastics material, the external layer being UV-protective film.

5. The panel according to claim 1, wherein the exterior covering is glued to the core by a polyurethane PU glue, a low-density polyethylene (LDPE) glue, hotmelt glues, or water-based glues.

6. The panel according to claim 1, wherein the external face of the core further includes a web of glass fibres or synthetic fibres, said web being bonded to the core by a binder crosslinking mineral fibres of said core.

7. The panel according to claim 1, wherein the exterior covering further includes at least two aluminium sheets, each aluminium sheet being bonded directly or via the adhesive, to one of the first and second layers of plastics material.

8. The panel according to claim 5, starting from the external face of the core, further comprising:
    a web of glass fibres integrated with mineral fibres of the core;
    a layer of adhesive;
    the external covering; and
    an external layer includes the UV-protective film.

9. The panel according to claim 1, wherein an edge of the panel end is configured to be interlocked.

10. The panel according to claim 1, wherein the internal covering and the external covering are extended by a flap partially overlapping the internal covering and the external covering and being sealed by a strip of a same material, when the panel is joined to another module.

11. The panel according to claim 1, wherein the interior covering is extended beyond an edge of the panel and fixed to a surface which defines a connecting profile, the interior covering being an interior face of the duct.

12. The self-supporting duct comprising:
    the panel according to claim 1.

13. The self-supporting duct according to claim 12, wherein the self-supporting duct is installed outside a building, an exterior layer of the self-supporting duct being exposed to weather.

14. A method of using the panels according to claim comprising:
    manufacturing the self-supporting ducts.

15. The method according to claim 14, wherein at least one of the self-supporting ducts is mounted outside a building, an exterior layer of the self-supporting duct being exposed to weather.

16. The panel according to claim 1, wherein the self-supporting ducts are air-conditioning ducts.

17. The panel according to claim 4, wherein the UV-protective film includes highly ultraviolet-resistant epoxy resins, urethanes, or polyvinyl fluorides.

18. The panel according to claim 5, wherein the exterior covering is glued to the core by the polyurethane PU glue or the low-density polyethylene (LDPE) glue.

19. The panel according to claim 7, wherein the first and second layers of plastics material are made of polyester.

20. A panel for self-supporting ducts, comprising:
    a core of mineral wool, an external face of the core being covered with an exterior covering and an internal face of the core being covered with an interior covering, respectively, wherein
    said interior covering includes an aluminium sheet,
    the exterior covering includes a succession of a layer of web of glass fibres, a first layer of plastics material, the aluminium sheet, and a second layer of plastics material, said first and second layers of plastics material being bonded to the aluminium sheet directly or via an adhesive, said layer of web of glass fibres being bonded to the core by a binder crosslinking mineral fibres of said core, and
    the second layer of plastics material is an outer layer including anti-LTV particles or a UV-protective film, or a surface of the second layer of plastics material is covered with a UV-protective plastic film.

* * * * *